Aug. 2, 1960
P. TOWER
2,947,566
UNIVERSAL PICK-UP TRUCK RACK
Filed Aug. 5, 1958
2 Sheets-Sheet 1
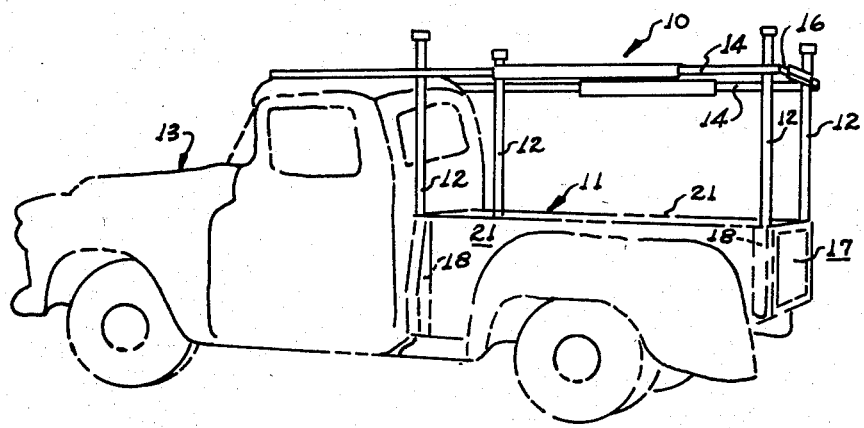
Fig 1
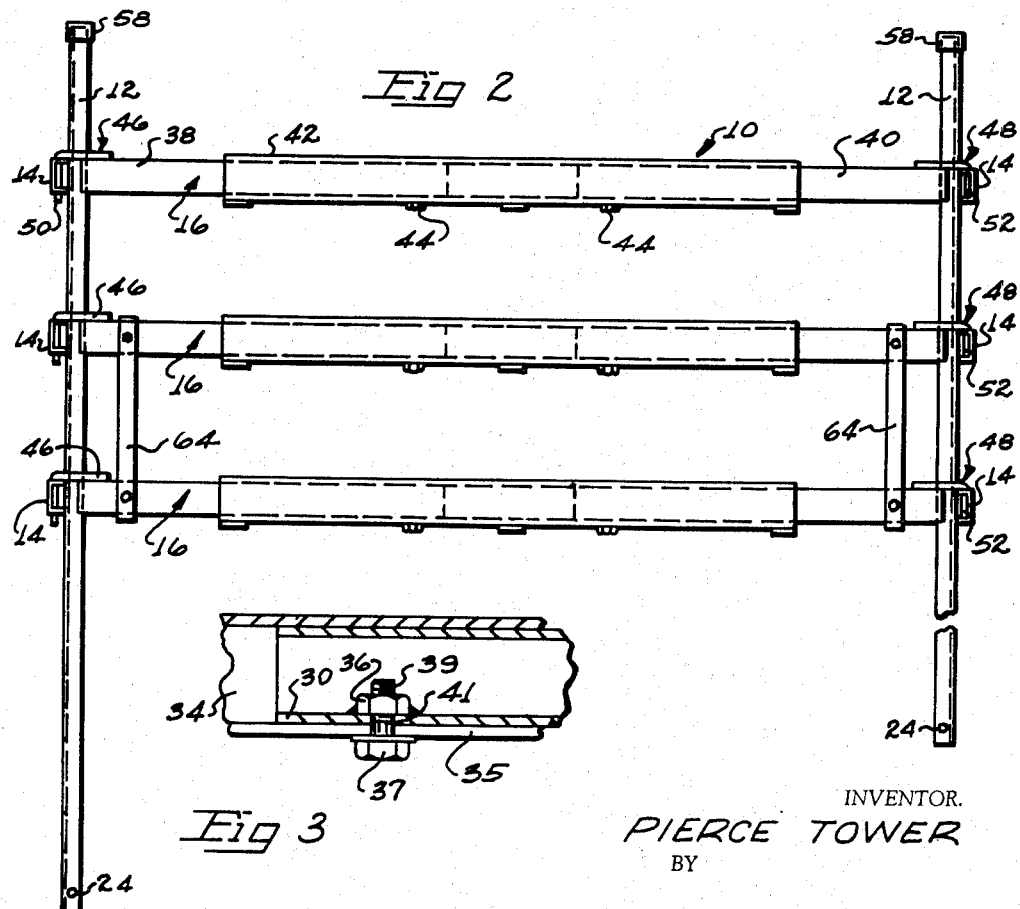
Fig 2
Fig 3
INVENTOR.
PIERCE TOWER
BY
SMITH, WILSON, LEWIS & McRAE

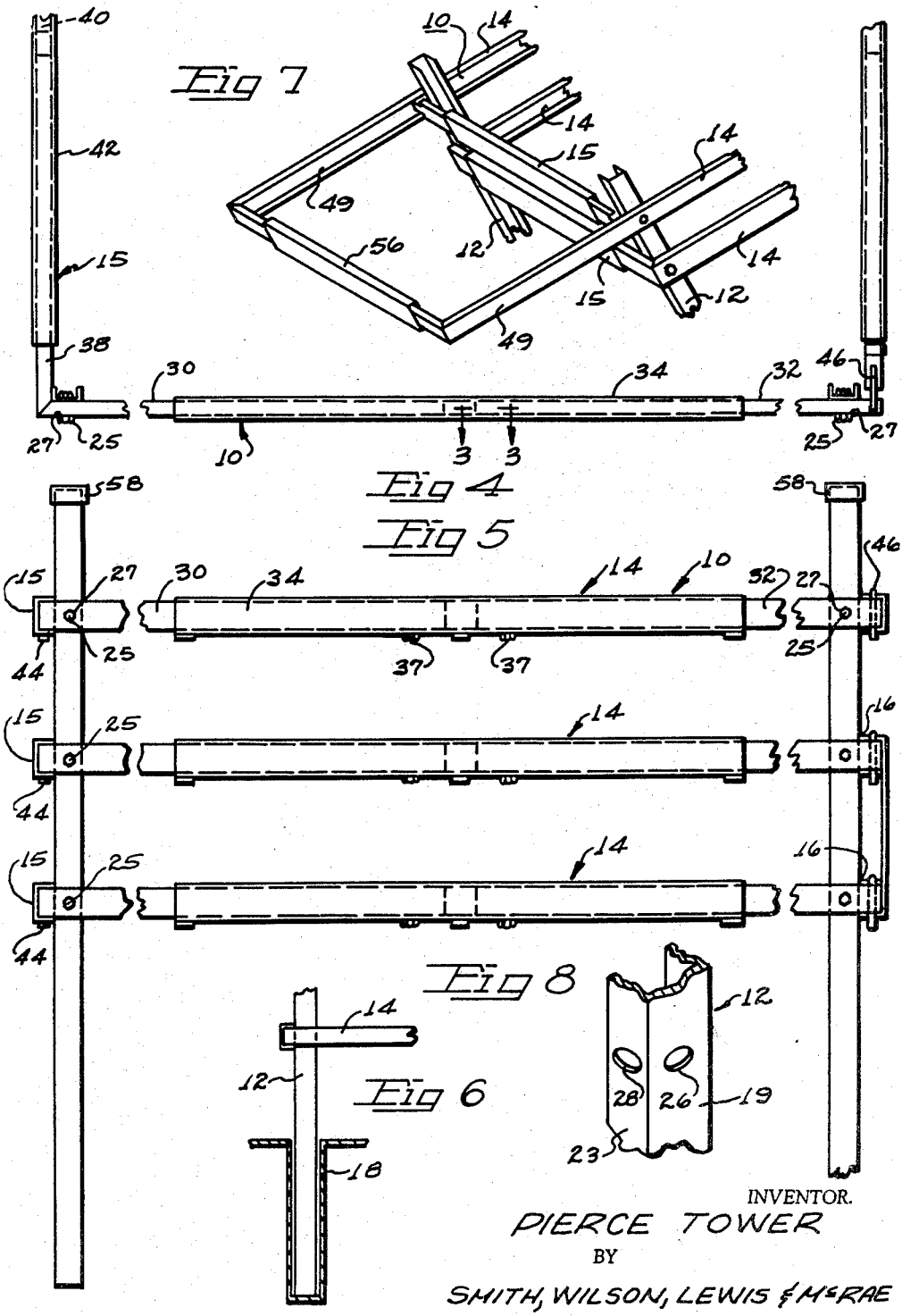

United States Patent Office 2,947,566
Patented Aug. 2, 1960

2,947,566
UNIVERSAL PICK-UP TRUCK RACK

Pierce Tower, Dearborn, Mich., assignor to Pierce Metal Products, Inc., Dearborn, Mich., a corporation of Michigan Filed Aug. 5, 1958, Ser. No. 753,307

7 Claims. (Cl. 296—10)

The present invention relates to a universal pick-up truck rack. More particularly, this invention relates to a rack for a pick-up truck which is adapted to build up the sides of the carrying box of the truck and which is adjustable as to size and may also be adjusted to cooperate with the various mounting means provided in different truck models.

The pick-up trucks presently marketed by the various automotive companies are provided with mounting means for the securement of utility racks to increase the height of the carrier box sides in order to increase the volumetric capacity of the trucks. However, in order to utilize the mounting means provided in a truck, which usually comprise a vertical recess in each corner of the carrying box, it is necessary that the truck owner purchase a rack designed specifically for each truck model. Consequently, if the truck owner buys a new model or a different make he frequently must purchase a new utility rack since the old rack may not be the proper size for the carrying box or may not fit or cooperate with the mounting means provided on the new truck.

Efforts have been made to provide universal-type utility racks which would fit the various pick-up truck models and sizes. However, such universal racks have necessitated separate mounting means for securement to the truck. This involves considerable expense in altering the truck body for securement of the separate mounting means. Further, if such a rack is transferred to a new truck, the mounting means must be removed from the old truck and reinstalled in the new truck. The time and work involved in removing rusted fastening means, drilling holes in the truck body and the dismantling and reassembling of the rack may in some cases be more expensive than buying a separate rack with each truck purchased.

According to the present invention, a rack is provided which is usable on the two most commonly used fittings provided in standard truck models and which is also adjustable as to size whereby to fit various carriage box sizes.

It is, therefore, a principal object of the present invention to provide a universally adjustable pick-up truck rack.

A further object of this invention is to provide a utility rack which is adjustable as to width and length in order to be adaptable to different truck sizes.

Another object of this invention is to provide a utility rack having corner uprights which may be revolved 90° in order to fit the most commonly provided fittings of pick-up trucks.

Another object of this invention is to provide a novel over-cab extension for the utility rack whereby very long articles, such as stepladders and pipe, may be conveniently carried by a truck having a relatively short carrying box.

Another object of this invention is to provide a loading gate for the rack which is swingable in two sections whereby articles loaded on top of the rack, such as ladders, will not have to be removed when the contents of the carriage box are unloaded.

Other objects of this invention will appear in the following description and appended claims, reference being had to the accompanying drawings forming a part of this specification wherein like reference characters designate corresponding parts in the several views.

In the drawings:

Figure 1 is a view in perspective of one embodiment of the utility rack of the present invention mounted in place on a pick-up truck;

Fig. 2 is an end elevational view of a second embodiment of the rack shown in Fig. 1;

Fig. 3 is a sectional view taken substantially along the line 3—3 of Fig. 4 looking in the direction of the arrows;

Fig. 4 is a partial top plan view of the Fig. 2 embodiment;

Fig. 5 is an end elevational view of the Fig. 2 embodiment;

Fig. 6 is a sectional view showing the lower end of an upright of the rack of the present invention mounted in a recess provided in a pick-up truck;

Fig. 7 is a partial perspective view showing the rack of Fig. 2 provided with an over-cab extension; and Fig. 8 is a perspective view of an upright utilized in the rack of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring specifically to the drawings, Figs. 2, 4 and 5 illustrate one embodiment of the rack 10 comprising four generally rectangular corner uprights 12 interconnected by detachable telescopic horizontally-extending side slats 14, truck-cab end slats 15 and gate end slats 16 to form a generally rectangular rack structure. As shown in Fig. 1, the rack 10 is adapted to be attached to the carrying box 11 of a pick-up truck 13 to form substantially vertical extensions of the side walls 21, 17. The slats 14, 15, 16 are provided as telescopic members to the end that the rack 10 is adjustable as to length and as to width to fit a variety of carrying boxes 11 which may vary considerably in size. There may be just one slat 14, 15, 16 extending between the uprights 12 as shown in Fig. 1 or there may be a plurality of vertically spaced slats 14, 15, 16 as shown in Figs. 2, 4 and 5. The number of slats used depends on the nature of the load to be carried by the truck 13. The uprights 12, which are detachably secured to the slats 14, are provided with alternate mounting openings 26, 28 whereby they are adapted to be secured to the slats 14 in alignment with the long sides 19 of the uprights 12 at substantially right angles to the long sides 21 of the carrying box 11 or with the long sides 19 substantially parallel to the long sides 21 of the carrying box 11. The purpose of this alternative securement procedure is to allow the uprights 12 to be properly oriented for insertion into mounting recesses 18 of the truck 13 which may be revolved 90° in different truck models. The recesses 18 are rectangular in shape, consequently they will not receive an upright 12 unless it is also rectangular and oriented in the same direction.

As may be seen in Fig. 6, the corner uprights 12, which may be channel members, are each provided with a portion projecting beneath the lowermost slats 14, 15, 16 for insertion into the elongated recesses 18 provided in the truck body at the corners thereof. In some constructions, openings may be provided at the lower ends of the recesses 18 for reception of fastening means to secure the lower end of the uprights 12. An opening 24, as shown in Fig. 2, may be provided in the uprights 12 to receive a pin or the like to cooperate with such securement openings. The openings 24 may be provided in both the flange portion and the web portions of the lower ends of the uprights 12 to cooperate with variously positioned recess 18 openings. The upper ends of the uprights 12 may be provided with caps 58, constructed of plastic or the like, to shield the sharp corners of the uprights 12 and prevent injury to truckers and cargo.

As shown in Fig. 8, the uprights 12 are provided with vertically spaced openings 26 in the web 19 and similarly positioned openings 28 in at least one flange 23. Each series of openings 26, 28 is positioned to register with openings provided in the ends 27 of the slats 14 for the insertion of detachable fastening means 25 which may be bolts, pins, screws or the like. By the use of either the web openings 26 or the flange openings 28, the uprights 12 may be secured in positions to be in alignment with the recesses 18 of the particular truck 13 upon which the rack 10 is to be mounted.

Each telescopic side slat 14 comprises two end channel members 30, 32 slidably interconnected by a square tube section 34. As may be readily understood, the slats 14 may be lengthened or shortened as required by a specific truck 13 by sliding the end members 30, 32 in and out of the tube 34.

As shown in Figs. 3 and 4, the tube 34 has a central slot 35 on the underside which extends the length of the tube 34. A bolt 37 is provided with its shank 39 extending through the slot 35 and an opening 41 in the channel member 30 into threading engagement with a nut 36 secured, as by welding, to the flange of the member 30. It will of course be understood that if desired a caged nut may be substituted for the welded nut 36, the cage being secured to the channel member 30 in a known manner to provide suitable adjustment of the position of the nut. The bolt 37, which has a head larger than the width of the slot 35, is tightened to lock the members 30, 34 after they have been adjusted to the desired length. Similar locking means are also provided for the other channel member 32.

The truck-cab end slats 15 and gate end slats 16 are constructed in the same manner as the side slats 14, having channel members 38, 40 interconnected by tube members 42 and provided with lock nuts 44. Each channel member 38, 40 may be secured to the adjacent side slat channel members 30 to form an integral angle-shaped member as shown or the truck gate end slats 15 may be secured directly to the uprights 12.

As shown in Figs. 2, 4 and 5, the gate end slats 16 are pivotally mounted in the end portions of the side slats 14 which extend for a short distance beyond the rear uprights 12. The pivotal mounting means comprises a pair of right-angle pins 46, 48 secured to the outer ends of the slats 16. The pins 46, 48 have downwardly extending pin portions 50, 52, each of a different length, for insertion into openings provided in the ends of the slat members 32. The gate slats 16 may be swung outwardly from the rack 10 for loading or unloading of the truck 13 by lifting the slat 16 upwardly to disengage the shorter pin portion 52 while the longer pin portion 50 remains in engagement with the slat 14. The slat 16 may then be swung outwardly to open the end of the truck 13. The lower end slats 16 may be secured together to move as a unit by means of brackets 64. The upper slats 16 may also be secured in this manner, however it is convenient to have these upward slats 16 independently movable whereby objects loaded on top of the rack, such as ladders, will not have to be moved when the gate is opened for unloading purposes.

In Fig. 7, another embodiment of the invention is shown comprising a rack 10 provided with an extension 49 of the uppermost side slat 14 adapted to project over the cab of the truck 13. The over-cab extension 49 is for the purpose of loading long articles, such as ladders or pipes, which will not fit into the carrying box 11. An end slat 56 is provided to interconnect the extending portions 49 of the slats 14 and is of the same construction as the truck-cab end slats 15.

In the use of the rack of the present invention, support members, such as boards, may be placed across the side slats 14 to form shelves for loading of different products; for instance when used to carry farm products, hogs can be loaded on the bottom of the carrying box while the boards will hold a second load of chickens.

The rack as described may be readily installed on a pick-up truck by one man with the use of a single wrench. It is sturdily constructed to carry any loads which a pick-up truck is designed to carry. The racks can be installed on one truck and then reinstalled on a new truck when models are changed and for this purpose the rack may be adjusted both as to width and as to length and also the uprights may be rotated to register with the pick-up truck mounting recesses which may be oriented differently in each truck model.

Having thus described my invention, I claim:

1. A utility rack for attachment to the carrying box of a pick-up truck to form substantially vertical extensions of the side walls thereof; said rack comprising four generally rectangular corner uprights; each upright having one side longer than the other; said uprights being interconnected by detachable telescopic horizontally-extending side and end slats to form a generally rectangular rack adjustable as to length and as to width; each of said uprights having openings in at least one long side and at least one short side to receive fastening means securing the slats thereto; said slats being secured to the uprights by means of the long side openings or the short side openings to permit the uprights to be oriented in positions with the long sides of the uprights at substantially right angles to the long sides of a truck-carrying box or with the long sides of the uprights substantially parallel to the long sides of a truck carrying-box whereby the lower end of the uprights may be inserted into similarly oriented rectangular recesses provided in a truck carrying-box.

2. A utility rack for attachment to the carrying-box of a pick-up truck to form substantially vertical extensions of the the side walls thereof; said rack comprising four channel-section corner uprights interconnected by detachable telescopic horizontally-extending side and end slats to form a generally rectangular rack adjustable longitudinally and laterally to vary the length and width thereof; each of said uprights having openings in the web portion and at least one flange portion to receive fastening means securing the slats thereto; said slats being secured to the uprights by means of the web openings or the flange openings to permit the uprights to be oriented in positions with their web portions at substantially right angles to the long sides of a truck carrying-box or with their web portions substantially parallel to the long sides of a truck carrying-box to the end that the lower ends of the uprights may be inserted into similarly oriented rectangular recesses provided in a truck carrying-box.

3. A utility rack as claimed in claim 2 and further characterized in that each of the telescopic side slats and end slats comprise a pair of support members secured at one end to adjacent uprights; a tubular member slidably receiving the free ends of said support members to form a continuous slat; and means to secure the support members to the tubular members to lock said members against sliding.

4. An adjustable truck rack for attachment to the carrying-box of a pick-up truck to form upward extensions of the side walls thereof, comprising two generally rectangular front corner uprights and a pair of generally rectangular rear corner uprights; each upright having one side longer than the other; said uprights being interconnected by detachable telescopic horizontally-extending side slats, truck cab end slats and gate end slats to form a generally rectangular rack adjustable as to length and as to width; each of said uprights having openings in at least one long side and in at least one short side to receive fastening means securing the slats thereto; said slats being secured to the uprights by means of the long side openings or the short side openings to permit the uprights to be oriented in positions with the long sides of the uprights at substantially right angles to the long sides of the truck carrying-box or with the long sides of the uprights substantially parallel to the long sides of the truck carrying-box whereby the lower ends of the uprights may be inserted into similarly oriented rectangular recesses provided in a truck carrying-box; a portion of the side slats extending for a short distance beyond the rear uprights; said projecting portions being provided with openings to receive downwardly extending pins provided on the ends of the gate end slats; the pins on one end of said slats being longer than the pins on the other end of said slats whereby each gate end slat is adapted to be lifted upwardly to disengage the shorter pins from the side slats and to subsequently be pivoted about the longer pin.

5. A rack as claimed in claim 4 and further characterized in that there are a plurality of vertically spaced side slats on each side of the rack, an equal number of cab end slats and gate end slats; and all of the gate end slats beneath the uppermost gate end slat being secured together to move as a unit.

6. An adjustable truck rack for attachment to the carrying-box of a pick-up truck to form upward extensions of the side walls thereof comprising a pair of generally rectangular front corner uprights and a pair of generally rectangular rear corner uprights; each of said front and rear uprights having one side longer than the other; a detachable telescopic horizontally-extending side slat connecting the upper ends of adjacent front and rear uprights; a swingable telescopic horizontally-extending gate slat between the rear uprights; said side slat extending beyond the front uprights and connected at their front ends by a telescopic horizontally-extending front end slat; said forwardly projecting portion of the side slats and said front end slat being adapted to extend over the cab of a pick-up truck; said uprights and slats forming a generally rectangular rack adjustable as to length and as to width; each of said uprights having openings in at least one long and at least one short side to receive fastening means securing the slats thereto; said slats being secured to the uprights by means of the long side openings or the short side openings to permit the uprights to be oriented in positions with the long sides of the uprights at substantially right angles to the long sides of a truck carrying-box or with the long sides of the uprights substantially parallel to the long sides of a truck carrying-box whereby the lower ends of the uprights may be inserted into similarly oriented rectangular recesses provided in the truck-carrying box.

7. A rack as claimed in claim 6 and further characterized in that a plurality of spaced detachable telescopic horizontally-extending side slats are provided beneath each uppermost side slat to extend between adjacent front and rear uprights; a plurality of spaced detachable telescopic horizontally-extending front end slats are provided beneath the uppermost front end slat to extend between the front uprights; and a plurality of spaced swingable telescopic horizontally-extending gate slats are provided beneath the uppermost gate slat to extend between the rear uprights; said lower gate slats being connected to swing together.

References Cited in the file of this patent

UNITED STATES PATENTS

| | | |
|---|---|---|
| 1,884,333 | Standish | Oct. 25, 1932 |
| 2,548,189 | Armstrong | Apr. 10, 1951 |
| 2,570,802 | Hatteburg | Oct. 9, 1951 |
| 2,720,414 | Hart | Oct. 11, 1955 |
| 2,751,248 | Kritser | June 19, 1956 |
| 2,808,291 | Van Meter | Oct. 1, 1957 |
| 2,838,338 | Kerley et al. | June 10, 1958 |
| 2,839,200 | Easterwood | June 17, 1958 |

FOREIGN PATENTS

| | | |
|---|---|---|
| 643,581 | France | Sept. 19, 1928 |